United States Patent
Lin et al.

(10) Patent No.: US 7,439,989 B2
(45) Date of Patent: Oct. 21, 2008

(54) DETECTING DOCTORED JPEG IMAGES

(75) Inventors: Zhouchen Lin, Beijing (CN); Junfeng He, Hong Kong (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 11/276,204

(22) Filed: Feb. 17, 2006

(65) Prior Publication Data

US 2007/0195106 A1    Aug. 23, 2007

(51) Int. Cl.
*G06T 15/00* (2006.01)

(52) U.S. Cl. .................... 345/629; 345/619; 382/112; 382/170

(58) Field of Classification Search ............... 345/619, 345/629; 382/112, 170, 171
See application file for complete search history.

(56) References Cited

U.S. PATENT DOCUMENTS 7,227,998 B2 * 6/2007 Nakayama et al. .......... 382/232

OTHER PUBLICATIONS

Popescu et al., Statistical Tools for Digital Forensics, Department of Computer Science at Dartmouth College, Lecture Note for Computer Science, pp. 128-147, 2004.*
Popescu et al., Exposing Digital Forgeries by Detecting Traces of Resampling, IEEE transaction on Signal Processing, Feb. 2005, pp. 758-767.*
Wang et al., Exposing Digital Forgeries in Video by Detecting Double MPEG Compression, MM&Sec'06, Sep. 2006, pp. 37-47.*
Popescu et al., Exposing Digital Forgeries by Detecting Duplicated Image Regions, Computer Science, Dartmouth College, Lecture notes, 2006, pp. 1-11.*

* cited by examiner

*Primary Examiner*—Phu K Nguyen
(74) *Attorney, Agent, or Firm*—Lee & Hayes, PLLC (57) ABSTRACT

Systems and methods for detecting doctored JPEG images are described. In one aspect, a JPEG image is evaluated to determine if the JPEG image comprises double quantization effects of double quantized Discrete Cosine Transform coefficients. In response to results of these evaluation operations, the systems and methods determine whether the JPEG image has been doctored and identify any doctored portion.

17 Claims, 4 Drawing Sheets

DETECTING DOCTORED JPEG IMAGES

BACKGROUND

Numerous image editing techniques are available to easily produce realistic synthetic images. Such techniques include, for example, cutting and pasting, in-painting, alpha matting, synthesis, etc. Image editing techniques are often utilized by the movie industry to synthesize special effects in movies without leaving noticeable visual artifacts. Although image editing technologies can greatly enrich the user experience and reduce certain production costs, realistic synthetic images (i.e., altered/doctored images) can also be substantially problematic. For example, use of doctored images in news reporting and photojournalism could threaten the legitimacy of using digital images for reporting purposes. In such scenarios, technologies to determine whether content of a digital image has been altered would be substantially useful.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, systems and methods for detecting doctored JPEG images are described. In one aspect, a JPEG image is evaluated to determine if the JPEG image comprises double quantization effects of double quantized Discrete Cosine Transform coefficients. In response to results of these evaluation operations, the systems and methods determine whether the JPEG image has been doctored.

BRIEF DESCRIPTION OF THE DRAWINGS

In the Figures, the left-most digit of a component reference number identifies the particular Figure in which the component first appears.

DETAILED DESCRIPTION

Overview

Systems, apparatus, computer-readable media, and methods (collectively referred to as "systems and methods") for detecting doctored JPEG images are described. A doctored image is a digital image where part of the content of the original/unaltered image has been changed. A doctored image contains both doctored and non-doctored (non-synthetic) portions. As a result, wholly synthesized images, for example, an image completely rendered by computer graphics or by texture synthesis, are not considered to be doctored images. However, if part of original image content is replaced by such synthesized or copied data, then that image has been doctored.

To detect a doctored image, the systems and methods evaluate double quantization (DQ) effects of double quantized DCT coefficients in a JPEG image (the evaluated image is either a non-doctored or a doctored image). The DQ effect is the exhibition of periodic peaks and valleys in the histograms of the DCT coefficients. Those portions of the DQ effects that break the DQ effect are considered to have been doctored, or altered, resulting in a synthetic image.

Figure 1:
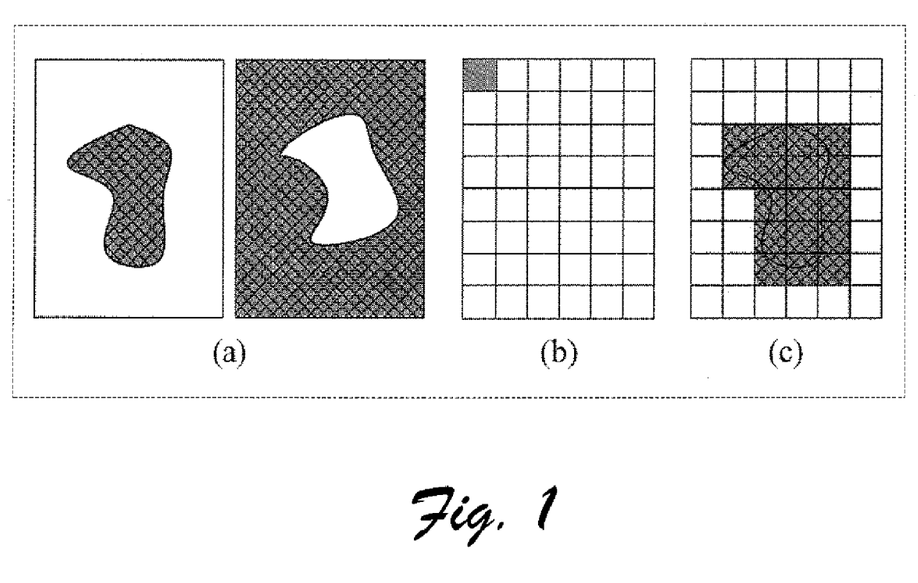
FIG. 1 shows an exemplary doctored image, an exemplary Discrete Cosine Transform (DCT) block (a "block"), and an exemplary doctored block, according to one embodiment.

FIG. 1 shows an exemplary doctored image (FIG. 1(a)), an exemplary image showing Discrete Cosine Transform (DCT) blocks (FIG. 1(b)), and an exemplary image showing a doctored DCT block (FIG. 1(c)). As shown in FIG. 1(a), a doctored image contains a non-doctored portion (e.g., the blank area) and a doctored portion (e.g., the shaded area). The non-doctored portion may represent an image background (e.g., please see the left image of FIG. 1(a)) or the image foreground (e.g., please see the right image of FIG. 1(a)). Referring to FIG. 1(b), a DCT block is a unit that is used in JPEG compression operations.

More particularly, a DCT block ("block") is a group of pixels in an 8×8 window on which DCT is operated when compressing an image. In this example, the gray block in the upper left-hand corner is one of the DCT blocks in the image. A DCT grid is a grid that partitions an image into DCT blocks (e.g., the 8×6 grid of horizontal and vertical lines shown in FIGS. 1b) and (c)). A doctored block (e.g., the shaded blocks of FIG. 1(c)) refers to a block in the doctored portion of an image or along the synthesis edge. A non-doctored block (e.g., respective ones of the blank blocks) is a DCT block that is completely inside a non-doctored portion of am image.

We now describe an exemplary system and exemplary procedure for detecting doctored JPEG images.

An Exemplary System

Although not required, the systems and methods for detecting doctored JPEG images are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 2:
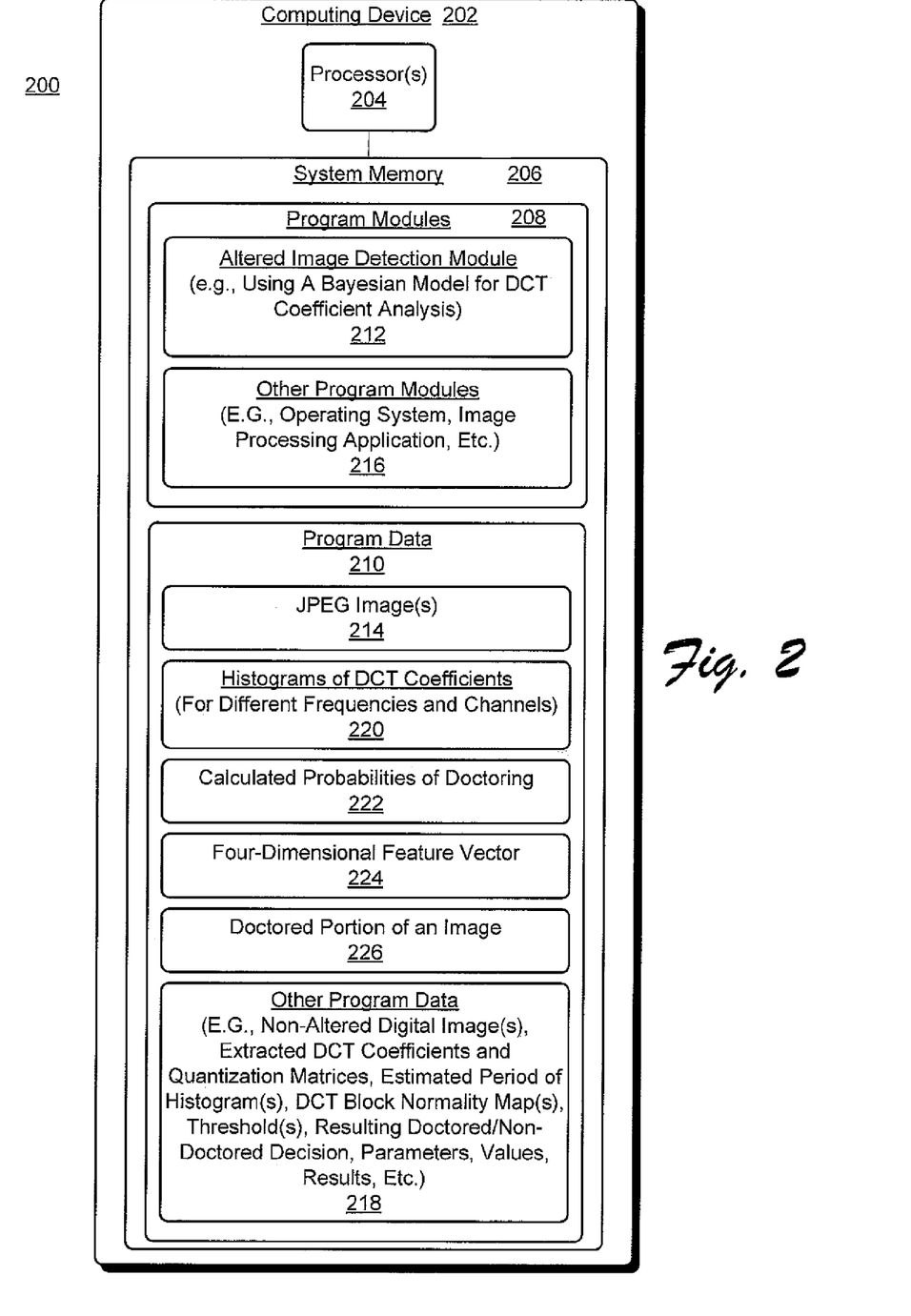
FIG. 2 illustrates an exemplary system for detecting doctored JPEG images, according to one embodiment.

FIG. 2 shows an exemplary system 200 for detecting doctored JPEG images, according to one embodiment. System 200 includes host computing device 202. Host computing device 202 represents any type of computing device such as a personal computer, a laptop, a server, handheld or mobile computing device, etc. Host computing device 202 includes one or more processing units 204 coupled across a bus 203 to system memory 206. System memory 206 includes computer-program modules ("program modules") 208 and program data 210. A processor 204 fetches and executes computer-program instructions from respective ones of the program modules 208. Program modules 208 include altered image detection module 212 for detecting whether a JPEG image 214 has been doctored, and "other program modules" 216 such as an operating system, image processing application, device drivers, etc.

Although system 100 may generate the JPEG image 214 using an image processing application to compress an original or non-altered digital image, the operations of altered image detection module 212 do not depend on whether the JPEG image 214 was created on system 100 or created on a different computing device and transferred/downloaded to system 100 from a data store (a database, memory device, etc.). To determine whether a JPEG image 214 has been doctored, image detection module 212 opens the JPEG image 214 and evaluates double quantization (DQ) effects of double quantized DUCT coefficients in the JPEG image 214. The DQ effect is the exhibition of periodic peaks and valleys in the histograms of the DCT coefficients. Those portions of the DQ affects that break the DQ effect are considered to have been doctored, or altered, resulting in a synthetic image.

An Exemplary Procedure

Figure 3:
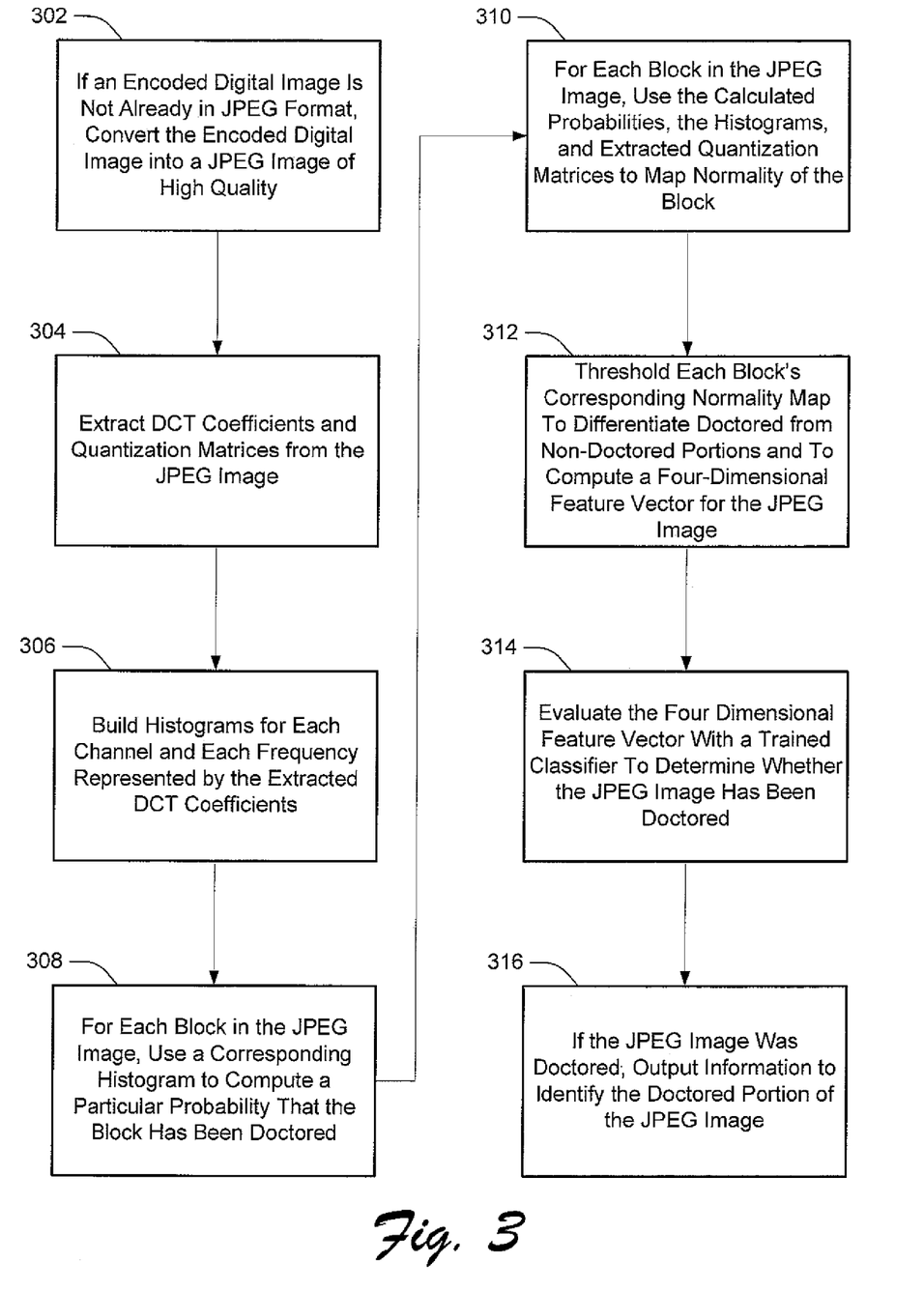
FIG. 3 shows an exemplary procedure for detecting doctored JPEG images, according to one embodiment.

FIG. 3 shows an exemplary procedure 300 for detecting doctored JPEG images, according to one embodiment. For purposes of exemplary description, the operations of the procedure are described with respect to components of system 200 of FIG. 2. The leftmost numeral of a component reference number indicates the particular figure where the component is first described.

At block 302, if an encoded digital image was originally stored in a lossless format different than JPEG, altered image detection model ("detection model") 212 converts the encoded digital image to the JPEG format (e.g., at the highest compression quality) to generate a JPEG image 214. Otherwise, the JPEG image 214 is already stored in system 200. At block 304, detection model 212 extracts DCT coefficients and quantization matrices for YUV channels from the JPEG image 214. For purposes of exemplary illustration, such extracted, DCT coefficients and quantization matrices are shown as a respective portion of "other program data" 218.

At block 306, detection model 212 builds histograms 220 for each channel and each frequency represented by the extracted DCT coefficients. The extracted DCT coefficients comprise 64 frequencies in total, varying from (0, 0) to (7, 7). For each frequency, the extracted DCT coefficients of all the blocks are used to build a respective histogram 220. Moreover, a color image is typically converted into YUV space for JPEG compression. Therefore, detection model 212 builds at most 64×3=192 histograms of DCT coefficients of different frequencies and different channels. However, as high frequency DCT coefficients are often quantized to zeros, and U and V channels are more heavily quantized than the Y channel is, detection module 212 builds only part of the total possible number of histograms. For Y channel, detection model 212 builds histograms 220 for frequencies from (0, 0) to (2, 2). For U and V channels, detection model 212 builds histograms 220 for frequencies from (0, 0) to (1, 1). As a result, detection module 212 generates 3×3+2×2+2×2=17 histograms 220.

At block 308, for each block in the JPEG image 214, detection model 212 uses a respective histogram 220 to compute a particular probability that the block has been doctored (please see, "calculated probabilities of doctoring" 222 of FIGS. 2). This is accomplished by evaluating the extracted quantization matrices to determine the DQ effect of the histogram 220. Exemplary techniques to perform such evaluations are described below in the section titled "JPEG Compression and Decompression". At block 310, for each block in the JPEG image 214, detection module 212 utilizes the 17 histograms 220 and corresponding ones of the 17 probabilities 222 to generate a normality map for that block. The normality map indicates a normality for that particular block. For purposes of exemplary illustration, such normality maps are shown as respective portions of "other program data" 218.

At block 312, detection module 212 applies a threshold to each block's corresponding normality map to differentiate a possibility of a doctored portion of the JPEG image 214 from a possibly non-doctored portion of the JPEG image 214, and thereby computes a four dimensional feature vector 224 for the JPEG image 214. At block 314, detection model 212 evaluates the four-dimensional feature vector 224 with a trained Support Vector Machine (SVM) to decide whether the JPEG image 214 is a doctored image. At block 316, if the JPEG image 214 has been doctored, detection module 212 identifies the specific portion(s) of the JPEG image 212 that have been doctored (i.e., please see "doctored portion of an image" 226 of FIG. 2).

We now describe JPEG compression and decompression operations in greater detail to show how altered image detection module 212 uses double quantization (DQ) effects of double quantized DCT coefficients to detect a doctored JPEG image 214

JPEG Compression and Decompression

To encode (compress) a digital image to form a JPEG image 214, the following three operations are typically performed:

Discrete cosine transform (DCT) operations: DCT operations first divide a digital image into DCT blocks. Each block is then subtracted by 128 and transformed to the YUV color space. Next, DCT is applied to each channel of the block.

Quanization Operations: Quantization Operations divide the DCT coefficients by a quantization step and rounds the results to the nearest integer. Generally, the higher the quality of compression utilized to encode a digital image, the smaller the quantization step, and vice versa. The quantization step may be different for different frequencies and different channels.

Entropy coding operations: These operations typically include lossless entropy coding of quantized DCT coefficients (e.g. Huffman coding). As part of the encoding process, quantization steps for different frequencies are generally stored in quantization matrices (luminance matrix for Y channel or chroma matrix for U and V channels). Such quantization matrices can be retrieved from a JPEG image 214.

Operations to decode a JPEG image 214 are typically the inverse of the operations used to encode the JPEG image 214: i.e., entropy decoding, de-quantization, and inverse DCT (IDCT). Quantization operations are not invertible, in contrast to DCT and entropy coding operations. Consequently, when a JPEG image 214 is doubly JPEG compressed, DCT coefficients will change as follows during the corresponding DCT and quantization-based compression and decompression operations. (Entropy encoding and decoding operations are not discussed as they do not contribute to information used by detection model 212 to detect altered JPEG images 214).

With respect to the first compression of the JPEG image 214, first DCT and quantization operations are performed. After DCT, assume that a coefficient value is u. In the first quantization, there was a quantization step $q_1$. In view of this, the DCT coefficient value is $Q_{q1}(u)=[u/q_1]$, where [x] means rounding x to the nearest integer.

With respect to the first decompression of the JPEG image 214, first de-quantization with $q_1$ and inverse DCT (IDCT) operations are performed. After de-quantization with $q_1$, the DCT coefficient value is represented as follows:

$$Q_{q1}^{-1}(Q_{q1}(u))=[u/q_1]q_1.$$

With respect to the second compression of the JPEG image 214, a second set of DCT and quantization operations are performed, with a quantization step $q_2$. At this point, the DCT coefficient value (i.e., a double quantized DCT coefficient) u is $Q_{q1q2}(u)=[[u/q_1]q_1/q_2]$.

Double quantized DCT coefficients have unique properties that altered image detection module 212 utilizes to determine whether the JPEG image 214 has been changed. These properties are associated with the double quantization effect, which is now described.

Double Quantization (DQ) Effect

Since JPEG implements quantization with a rounding function, the DQ effect is discussed in view of quantization operations that utilize a rounding function. To this end, $h_1$ and $h_2$ respectively represent histograms 220 (FIG. 2) of extracted DCT coefficients of a frequency before a first quantization and after the second quantization. These histograms 220 are used to show how $h_1$ changes after double quantization. Suppose a DCT coefficient in the $u_1$-th bin of $h_1$ is relocated in a bin $u_2$ in $h_2$, then $$Q_{q_1 q_2}(u_1) = \left[ \left[ \frac{u_1}{q_1} \right] \frac{q_1}{q_2} \right] = u_2.$$

Hence, $$u_2 - \frac{1}{2} \le \left[ \frac{u_1}{q_1} \right] \frac{q_1}{q_2} < u_2 + \frac{1}{2}.$$

Therefore, $$\left\lceil \frac{q_2}{q_1} \left( u_2 - \frac{1}{2} \right) \right\rceil - \frac{1}{2} \le \frac{u_1}{q_1} < \left\lfloor \frac{q_2}{q_1} \left( u_2 + \frac{1}{2} \right) \right\rfloor + \frac{1}{2},$$

where $\lceil x \rceil$ and $\lfloor x \rfloor$ denote a ceiling and a floor function, respectively.

The number $n(u_2)$ of the original histogram bins contributing to bin $u_2$ in the double quantized histogram can be expressed as:

$$n(u_2) = q_1 \left( \left\lfloor \frac{q_2}{q_1} \left( u_2 + \frac{1}{2} \right) \right\rfloor - \left\lceil \frac{q_2}{q_1} \left( u_2 - \frac{1}{2} \right) \right\rceil + 1 \right) \quad (1)$$

Note that $n(u_2)$ is a periodic function with a period of $p=q_1/c$, where c is the greatest common divisor of $q_1$ and $q_2$. This periodicity is the reason of the periodic pattern in histograms of double quantized signals (e.g., please see FIGS. 4(c) and (d), which are discussed below). When $q_2 < q_1$, a histogram 220 after double quantization may have periodically missing values (For example, when $q_1=5$, $q_2=2$, $n(5k+1)=0$. Please also refer to FIG. 4(c)), while when $q_2>q_1$ the histogram 220 can exhibit some periodic pattern of peaks and valleys (e.g., please see FIG. 4(d), discussed below). In both cases, it could be viewed as showing peaks and valleys periodically. This is called the double quantization (DQ) effect.

Figure 4:
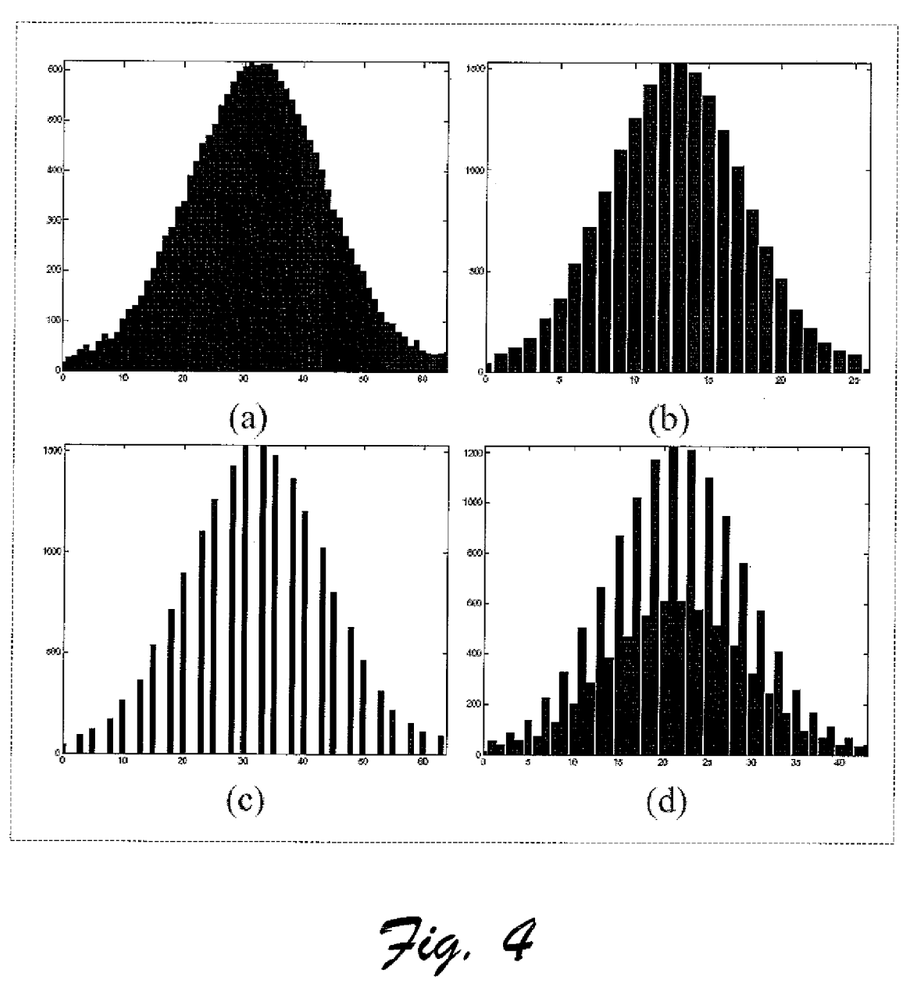
FIG. 4 shows an exemplary set of DCT coefficient histograms respectively representing single or double quantized signals, according to one embodiment.

FIG. 4 shows an exemplary set of histograms 220 respectively representing single or double quantized signals, according to one embodiment. More particularly, FIG. 4(a) is a histogram of exemplary single quantized signals associated with quantization with $q_1=2$ during the first compression of a JPEG image 214. FIG. 4(b) is a histogram of exemplary single quantized signals associated with quantization with $q_1=5$ during the first compression of a JPEG image 214. FIG. 4(c) is a histogram of double quantized signals associated with the first quantization with $q_1=5$ during the first compression operations and the second quantization with $q_2=2$ during the second compression operations associated with the JPEG image 214. FIG. 4(d) is a histogram of double quantized signals associated with the first quantization with $q_1=2$ during the first compression operations and the second quantization with $q_2=3$ during the second compression operations associated with the JPEG image 214. Please note the periodic artifacts in the histograms of double quantized signals.

DQ Effect Analysis in Doctored JPEG Images

As long as a JPEG image 214 contains both the doctored part and the non-doctored part, the DCT coefficient histograms 220 of the non-doctored part will still have DQ effect, because this part of the doctored image is the same is that of the double compressed original JPEG image 214. But the histograms 220 of doctored part will not have DQ effects. Reasons for this include, for example, absence of the first JPEG compression in the doctored part, mismatch of the DCT grid of the doctored part with that of the non-doctored part, and/or composition of DCT blocks along the boundary of the doctored part. With respect to absence of the first JPEG compression in the doctored part, suppose the doctored part is cut from a bitmap image or other kind of image rather than JPEG ones. In this scenario, the doctored part will not undergo the first JPEG compression, and of course does not have DQ effect. Similarly, when the doctored part is synthesized by alpha matting or in-painting, or other similar skills, then the doctored part will not have DQ effect either.

With respect to mismatch of the DCT grid of the doctored part with that of the non-doctored part, suppose the doctored part is cut from a JPEG image, or even the original JPEG image itself In this scenario, the doctored part is still of little possibility to have DQ effect. Recall that to assure the existence of DQ effect, the DCT in the second compression is the inverse operation of IDCT in the first decompression. But if there is mismatch of the DCT grids, then the assumption is violated. For example, if the first block of a JPEG image 214, i.e. the block from pixel (0,0) to pixel (7,7), is pasted to another position of the same image, say to the position from pixel (18,18) to (25,25), then in the second compression step, the doctored part will be divided into four sub-blocks: block (18,18)-(23,23), block (24,18)-(25,23), block (18,24)-(23, 25), and block (24,24)-(25,25). None of these sub-blocks can recover the DCT coefficients of the original block.

With respect to composition of DCT blocks along the boundary of the doctored portion of a JPEG image 214, there is little possibility that a doctored portion of a JPEG image 214 will exactly include 8×8 blocks. Rather, blocks along the boundary of the doctored portion will consist of pixels in the doctored portion and also pixels in the non-doctored portion. These blocks also do not follow the rules of DQ effect. Moreover, some post-processing, such as smoothing or alpha matting, along the boundary of the doctored part can also cause those blocks break the rules of DQ effect.

In view of the above, when a doctored portion of a JPEG image 214 is synthesized or edited, DQ effect may be absent in the doctored portion. Therefore, a histogram of the whole doctored JPEG image 214 can be regarded as the superposition of two histograms: one has periodical peaks and valleys, and the other has random bin values in the same period. This information is contributed by non-doctored and doctored portions of a JPEG image 214, respectively.

Exemplary Bayesian Approach of Detecting Doctored Blocks

Doctored blocks and non-doctored blocks of a JPEG image 214 may provide different contributions to a same bin in one period of a histogram 220. For instance, suppose a period starts from the $s_0$-bin and ends at the $(s_0+p-1)$-th bin, then the possibility of an non-doctored block which contributes to that period appearing in the $(s_0+i)$-th bin can be estimated as:

$$P_u(s_0 + i) = \frac{h_2(s_0 + i)}{\sum_{u=0}^{p-1} h_2(s_0 + u)}, \quad (2)$$

because it tends to appear in the high peaks and the above formula indeed gives high values at high peaks. On the other hand, the possibility of a doctored block which contributes to that period appearing in the bin ($s_0+i$) can be estimated as:

$$P_d(s_0 + i) = \frac{1}{p}, \quad (3)$$

This is because its distribution in one period should be random. From the naive Bayesian approach, if one block appears in the ($s_0+i$)-th bin, then the posteriori probability of it being a doctored block or an non-doctored block is:

$$P(\text{doctored} | s_0 + i) = \frac{P_d}{P_d + p_u}, \text{ and} \quad (4)$$

$$P(\text{undoctored} | s_0 + i) = \frac{P_u}{P_d + P_u}, \quad (5)$$

respectively.

The computation of the above probabilities assumes knowledge of period p, which further assumes knowledge of quantization step $q_1$ of the first compression. Unfortunately, it is very difficult to recover $q_1$. Therefore, altered image detection module 112 estimates period p of a histogram 220 as follows. Suppose $s_0$ is the index of the bin that has the largest value. For each p between 1 and $s_{max}/20$, we want to 112 computes the following quantity:

$$H(p) = \frac{1}{i_{max} - i_{min} + 1} \sum_{i=i_{min}}^{i_{max}} [h_2(i \cdot p + s_0)]^\alpha,$$

where $i_{max} = \lfloor (s_{max}-s_0)/p \rfloor$, $i_{min} = \lfloor (s_{min}-s_0)/p \rfloor$, $h_2(i)$ is the value of the i-th bin, $s_{max}$ and $s_{min}$ are the maximum and minimum index of the bins in the histogram, respectively, and $\alpha$ is a parameter (can be simply chosen as 1). H(p) evaluates how well the supposed period p gathers the high-valued bins. The period p is finally estimated as:

$$p = \arg\max_p H(p).$$

If p=1, then this histogram shows that the JPEG image 214 is single compressed. In this scenario, altered image detection module 212 cannot tell whether a block is doctored or not. At this point, altered image detection module 212 evaluates the next histogram 220.

Feature Extraction

If p>1, then in each period, altered image detection model 212 computes a probability value 222 (FIG. 2) for every block contributing to the bins in the period, using equation (4). The normality of each block is assigned as the accumulated posterior probabilities. This provides a normality map for all blocks (such normality maps are shown as respective portions of "other program data" 218). If the image is doctored, low normality blocks may cluster. Any of multiple well-known image segmentation algorithms can be applied to do this clustering task. However, to save computation, altered image detection model 212 simply thresholds the normality map by choosing a threshold:

$$T_{opt} = \arg\max_T \frac{\sigma}{\sigma_0 + \sigma_1}, \quad (6)$$

where given a T the blocks are classified into to classes $C_0$ and $C_1$, $\sigma_0$ and $\sigma_1$ are the variances of the normalities in each class, respectively, and $\sigma$ is the squared difference between the mean normalities of the classes.

With the optimal threshold, blocks in class $C_0$ (i.e. those having normalities below $T_{opt}$) will likely be doctored blocks. However, this is still insufficient for a confident decision because any normality map can be segmented in the above manner. However, based on the segmentation, altered image detection module 212 extracts four features: $T_{opt}$, $\sigma$, $\sigma_0+\sigma_1$, and computes the connectivity $K_0$ of $C_0$. Again, although there are many methods to define the connectivity, considering the computation load, altered image detection module 212 computes connectivity as follows. First the normality map is medium filtered. Then for each block i in $C_0$, the number $e_i$ of blocks in class $C_1$ in its 4-neighborhood is determined. Then $$K_0 = \frac{1}{N_0} \sum_i \max(e_i - 2, 0),$$

where $N_0$ is the number of blocks in $C_0$. As indicated, the more connected $C_0$ is, the smaller $K_0$ is. In this implementation, $\max(e_i-2,0)$ is utilized, rather than utilizing $e_i$ directly. This is because a narrow shaped $C_0$ is allowed. In another implementation, $e_i$ is used directly and a round shaped $C_0$ is desired.

With the four-dimensional feature vector, altered image detection module 212 determines whether a JPEG image 214 has been doctored by evaluating the feature vector with an SVM trained by a standard method, e.g. using the Matlab Support Vector Machine Toolbox. If the output from the SVM implemented by altered image detection model 212 is positive, then $C_0$ is decided as the doctored portion of the JPEG image 214 (e.g., doctored portion of image 226 of FIG. 2).

CONCLUSION

Although the systems and methods for detecting doctored JPEG images have been described in language specific to structural features and/or methodological operations or actions, it is understood that the implementations defined in the appended claims are not necessarily limited to the specific features or actions described. Rather, the specific features and operations of system 200 are disclosed as exemplary forms of implementing the claimed subject matter.

The invention claimed is:

1. A method at least partially implemented by a computing device, the method comprising:

evaluating a JPEG image to determine that the JPEG image comprises double quantization effects of double quantized Discrete Cosine Transform (DCT) coefficients; and responsive to the evaluating:
  determining that the JPEG image has undergone two compression operations, and
  determining that the JPEG image has been doctored when a portion of the JPEG image that does not represent an entirety of the JPEG image does not exhibit double quantization effects.

2. The method of claim 1, wherein double quantized DCT coefficients are a result of first and second quantization operations associated with a JPEG image.

3. The method of claim 1, wherein a doctored JPEG image comprises an altered portion and a non-altered portion, the altered portion representing content that has been changed from an original non-altered state.

4. The method of claim 1, further comprising if the JPEG image has been doctored, identifying one or more portions of the JPEG image that have been doctored.

5. The method of claim 4, further comprising:
  computing, for each of multiple DCT blocks that comprise the JPEG image, a respective probability of multiple probabilities that the block has been altered, the respective probability being based on one or more of the quantization matrices and a corresponding one or more of the histograms; and
  generating for each of the multiple DCT blocks, based on an accumulated posterior of the probabilities, a respective normality map of multiple normality maps for use in determining whether the JPEG image has been altered.

6. The method of claim 5, further comprising differentiating any doctored portion of the JPEG image from any non-doctored portion of the JPEG image based on the multiple normality maps to identify a doctored portion of the JPEG image.

7. The method of claim 1, further comprising before the evaluating:
  extracting DCT coefficients and quantization matrices from the JPEG image;
  generating histograms for frequencies and color channels represented by the DCT coefficients to represent any periodic pattern of double quantized signals; and
  wherein evaluating the JPEG image to determine that the JPEG image comprises double quantization effects of double quantized Discrete Cosine DCT coefficients is based on information provided at least in part by the histograms.

8. A computer-readable medium comprising computer-program instructions that, when executed by a processor, cause the processor to perform a method, the method comprising:
  extracting Discrete Cosine Transform (DCT) coefficients and quantization matrices from a JPEG image;
  generating one or more histograms for frequencies and color channels represented by the DCT coefficients to represent periodic patterns of double quantized signals;
  evaluating the JPEG image to determine if the JPEG image comprises double quantization effects of double quantized DCT coefficients, the double quantized DCT coefficients resulting from first and second quantization operations on the JPEG image, wherein the evaluating is based on information provided at least in part by the one or more histograms;
  determining that at least part of the JPEG image has been doubly compressed; and
  responsive to the determining, identifying, using the double quantization effects, a portion of the JPEG image that has been doctored, by determining that the portion does not exhibit double quantization effects.

9. The computer-readable medium of claim 8, wherein a doctored JPEG image comprises an altered portion and a non-altered portion, the altered portion representing content that has been changed from an original non-altered state.

10. The computer-readable medium of claim 8, wherein the computer-program instructions further comprise instructions for:
  computing, for each of multiple DCT blocks that comprise the JPEG image, a respective probability of multiple probabilities that the block has been altered, the respective probability being based on one or more of the quantization matrices and a corresponding one or more of the histograms;
  generating for each of the multiple DCT blocks, based on an accumulated posterior of the probabilities, a respective normality map of multiple normality maps for use in identifying the portion.

11. The computer-readable medium of claim 10, wherein the computer-program instructions further comprise instructions for differentiating any doctored portion of the JPEG image from any non-doctored portion of the JPEG image based on the multiple normality maps.

12. The computer-readable medium of claim 11, wherein the doctored portion of the JPEG image does not have double quantization effects because of one or more of a plurality of reasons comprising:
  there is an absence in the doctored portion, of a first compression of the doubly compressed JPEG image;
  there is a mismatch of a DCT grid of the doctored portion with that of the non-doctored portion; and
  there is a mixed composition of DCT blocks along a boundary of the doctored portion, the DCT blocks along the boundary consisting of pixels in the doctored portion and the non-doctored portion.

13. A computing device comprising:
  a processor; and
  a memory coupled to the processor, the memory comprising computer-program instructions executable by the processor to perform a method, the method comprising:
    extracting DCT coefficients and quantization matrices from a JPEG image;
    generating histograms for frequencies and color channels represented by the DCT coefficients to represent periodic patterns of double quantized signals;
    evaluating the JPEG image in view of information provided at least in part by the histograms to determine that the JPEG image comprises double quantization effects of double quantized Discrete Cosine Transform (DCT) coefficients; and
    responsive to the evaluating:
      determining that the JPEG image has undergone two compression operations, and
      determining that the JPEG image has been doctored if a portion of the JPEG image that does not represent an entirety of the JPEG image does not exhibit double quantization effects.

14. The computing device of claim 13, wherein the computer-program instructions for the evaluating use a Bayesian Support Vector Machine to assess whether the JPEG image has been doctored.

15. The computing device of claim 13 wherein the computer-program instructions further comprise instructions for:
  computing, for each of multiple DCT blocks that comprise the JPEG image, a respective probability of multiple probabilities that the block has been altered, the respective probability being based on one or more of the quantization matrices and a corresponding one or more of the histograms; and generating for each of the multiple DCT blocks, based on an accumulated posterior of the probabilities, a respective normality map of multiple normality maps for use in determining whether the JPEG image has been altered.

16. The computing device of claim 15, wherein the computer-program instructions further comprise instructions for differentiating any doctored portion of the JPEG image from any non-doctored portion of the JPEG image based on the multiple normality maps.

17. The computing device of claim 13, wherein the computer-program instructions further comprise instructions for differentiating any doctored portion of the JPEG image from any non-doctored portion of the JPEG image based on the multiple normality maps.

* * * * *